United States Patent
Lee

(10) Patent No.: US 8,998,445 B2
(45) Date of Patent: Apr. 7, 2015

(54) CHRONOGICAL ENERGY SAVING COLOR SEPARATE SYSTEM

(75) Inventor: Chi-Hung Lee, Taichung (TW)

(73) Assignee: Feng Chia University, Taichung (TW)

( * ) Notice: Subject to any disclaimer, the term of this patent is extended or adjusted under 35 U.S.C. 154(b) by 97 days.

(21) Appl. No.: 13/572,218

(22) Filed: Aug. 10, 2012

(65) Prior Publication Data
US 2013/0314941 A1    Nov. 28, 2013

(30) Foreign Application Priority Data
May 23, 2012  (TW) .............................. 101118291 A

(51) Int. Cl.
| F21V 5/02 | (2006.01) |
| G02B 27/12 | (2006.01) |
| G03B 21/00 | (2006.01) |
| G02F 1/1335 | (2006.01) |
| F21V 8/00 | (2006.01) |

(52) U.S. Cl.
CPC .. G02B 27/126 (2013.01); *G02F 2001/133607* (2013.01); *G02B 6/005* (2013.01); *F21V 5/02* (2013.01); G02B 6/0001 (2013.01); G03B 21/00 (2013.01); *G02F 1/133615* (2013.01); *G02F 2001/133622* (2013.01); G02B 6/0035 (2013.01); G02B 6/0068 (2013.01)

(58) Field of Classification Search
CPC ...... G02B 6/003; G02B 6/0035; G02B 6/005; G02B 6/0068; G02F 2001/133622; G02F 2001/133607; F21V 5/02; F21V 5/04
USPC ............ 362/231, 97.2–97.4, 601–602, 362/606–607, 330, 327, 333, 612, 613, 617, 362/619, 620, 625, 626; 349/61–65; 359/618, 619, 639, 640

See application file for complete search history.

(56) References Cited

U.S. PATENT DOCUMENTS

| 4,807,978 | A | | 2/1989 | Grinberg et al. | |
| 6,791,639 | B2 | * | 9/2004 | Colgan et al. | 349/95 |
| 7,936,412 | B2 | * | 5/2011 | Numata et al. | 349/57 |
| 8,339,538 | B2 | * | 12/2012 | Uehara et al. | 349/64 |
| 8,441,602 | B2 | * | 5/2013 | Kim et al. | 349/112 |
| 8,506,150 | B2 | * | 8/2013 | Kashiwagi et al. | 362/607 |
| 8,659,830 | B2 | * | 2/2014 | Brott et al. | 362/607 |
| 2007/0279942 | A1 | * | 12/2007 | Tsai | 362/626 |
| 2008/0068836 | A1 | * | 3/2008 | Hatanaka et al. | 362/231 |
| 2009/0316274 | A1 | * | 12/2009 | Lee et al. | 359/634 |
| 2009/0323194 | A1 | * | 12/2009 | Lin et al. | 359/639 |
| 2011/0141412 | A1 | * | 6/2011 | Lee et al. | 349/106 |
| 2011/0242457 | A1 | * | 10/2011 | Lee et al. | 349/63 |
| 2012/0218776 | A1 | * | 8/2012 | Lee et al. | 362/606 |
| 2013/0201424 | A1 | * | 8/2013 | Uchida et al. | 349/64 |

* cited by examiner

*Primary Examiner* — Y M Lee
(74) *Attorney, Agent, or Firm* — Tim Tingkang Xia, Esq.; Morris, Manning & Martin, LLP

(57) ABSTRACT

A time sequence energy saving color splitting system includes at least one light source provided on a surface of the guide module and composed of multiple light illuminating elements capable of illuminating light beams with different wavelengths and arranged in array, the at least one light source being able to illuminate light beams with specific wavelengths in two time sequences and entering the guide module and a color splitting module provided on the guide module, comprised of a first surface and a second surface, wherein the first surface is a collar structure per unit cycle and the second surface is a non-spherical structure per unit cycle, the non-spherical structure per unit cycle corresponds to the collar structure every two unit cycles.

10 Claims, 6 Drawing Sheets

CHRONOGICAL ENERGY SAVING COLOR SEPARATE SYSTEM

CROSS-REFERENCE TO RELATED APPLICATION

This application claims priority from application No. 101118291, filed on May 23, 2012 in the Taiwan Intellectual Property Office, the entire contents of which are hereby incorporated by reference.

BACKGROUND OF THE INVENTION

1. Field of the Invention

The present invention is related to a chronological energy saving color separate system, and more particularly to a color separation system capable of providing lights with specific wavelengths in different time sequences into a light guide module to maintain high optical efficiency.

2. Description of Related Art

In flat displays, backlight light source often is associated with a spatial light modulator and a color filter to present full color image. However, in large systems, such as cameras or projectors triple plates or duel plate prism set is adopted or a color filter is matched with high collimation light source to present a full color image. When the color filter is adopted by the system, because each pixel shader can only present one of the original three colors (R, G, B), two thirds (2/3) of the incident light energy is absorbed, which decreases the optical effect and shortens the battery lifespan.

In addition, the manufacture process for making a color filter is complex and complicated. In order to show one of the original colors (R, G, B), there has to be at least one lithography process associated with such capability, which highly increases the cost for making the color filter. Under such a circumstance, an optical module having the capability of a color filter to show at least one of the three original colors and with low manufacturing cost is necessary. Such an optical module is able to maintain high optical effect and generate color distribution corresponding to the plate pixel and vertically extending into liquid crystal layer. Studies show that the light intensity coming out of the display is only about one tenth (1/10) of the original light intensity, wherein the color filter and the polarization film take most of the responsibilities, which use approximately 40% and 20% of the original light energy respectively.

Color light splitting used in optics generally has photoresist absorption method, thin film optical method, light grating method and prismatic light splitting method respectively. All these methods used in flat displays have their respective disadvantages. For example, the photoresist absorption method is low in effect, thin film optical method is high in cost, light grating method is low in capability to deal with noise and requires high collimation light source and the prismatic light splitting method is inappropriate for film structure.

In U.S. Pat. No. 4,807,978, a similar method is disclosed, wherein the content is about a display device which comprises a liquid crystal spatial light modulator associated with diffractive means, such as a deflection grating comprising grating elements. The deflection grating is illuminated by a light source and each element is chirped and blazed so as to separate the primary colors of the illuminating light and direct them to individual light-modulating elements (R, G, B) of the modulator. By dispensing with conventional color filters, the efficiency of the display device is improved. Further, the focusing action of the grating elements directs light to the elements of the modulator so as to prevent light wastage caused by blocking of light by opaque regions of the display. In this method, in order to allow the emerging light to enter the display vertically, the incident light has to enter the deflection flashing grating in large angle. However, the large angle limitation will cause the emerging light to enter the display in also large angle, which is not appropriate for application in thin film display.

In U.S. Pat. No. 4,807,978, a color separation system is disclosed, which comprises: a backlight source, being highly collimated and used for providing an incident beam; a color separation module, formed with a first color separation film for separating the incident beam basing on wavelength while deflecting the optical paths of the resulting split beams; and a beam splitting module, being configured with at least one beam splitting plate and a liquid crystal layer; wherein, the at least one beam splitting plate is used for converging the beams from the color separation module while deflecting the optical paths thereof for enabling those to be discharged thereout following a normal direction of a light emitting surface of the backlight source. Because multi-layered holographic module is employed, the optical effect is low and the alignment among holographic arrays is not satisfactory, the disadvantages above while in application still lie ahead of the researchers. This system uses three sets of holographic modules, the manufacture process is complicated and also the alignment among deflection arrays of the holographic modules is causing a much bigger problem.

Another literature discloses using an optical structure to replace a color filter, which mainly uses a lens set in association with a prism to generate color splitting. Then a new set of holographic filter is employed to allow each color to correspond to a pixel. As the lens set is mounted on the prism and the prism structure occupies different percentages in the light field, despite the great light effect, it is impossible to manufacture.

SUMMARY OF THE INVENTION

The primary objective of the present invention is to provide a chronological energy saving color separation system with high optical effect and being capable of generating incident light perpendicularly entering the display.

In order to accomplish the above objective, the chronological energy saving color separation system of the present invention includes:

a guide module directing incident light which is sideways relative to the guide module to emerging light with an angle relative to a horizontal surface of the guide module;

at least one light source module respectively provided on a surface of the guide module and composed of multiple illuminating elements to illuminate in two time sequences with different wavelengths entering the guide module; and a color splitting module mounted on the guide module and composed of a first surface and a second surface, wherein the first surface is composed of a collar structure per unit cycle and the second surface is composed of a prismatic structure or a polygonal structure per unit cycle. The prismatic structure or the polygonal structure per unit cycle corresponds to the collar structure within two unit cycles.

In a different embodiment of the present invention, the system constructed in accordance with the present invention includes:

a color splitting module composed of a first surface and a second surface, wherein the first surface is composed of a collar structure per unit cycle and the second surface is composed of a prismatic structure or a polygonal structure per unit cycle; and a light source mounted below the light splitting module and having multiple illuminating arrays emitting light with different wavelengths and a substrate, wherein light from the illuminating arrays is inclined relative to the color splitting module and illuminates in different time sequences with specific wavelengths to enter the color splitting module. The prismatic structure or the polygonal structure per unit cycle corresponds to the collar structure within two unit cycles.

DETAILED DESCRIPTION OF THE INVENTION

Figure 1:
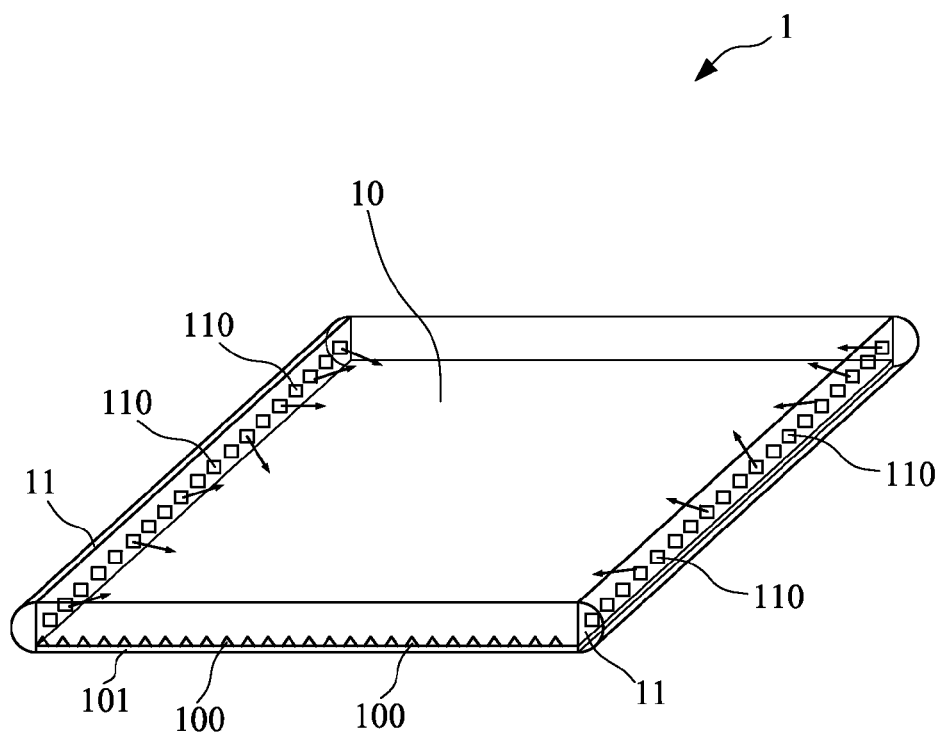
FIG. 1 is a schematic view of the first embodiment of the present invention.
Figure 2:
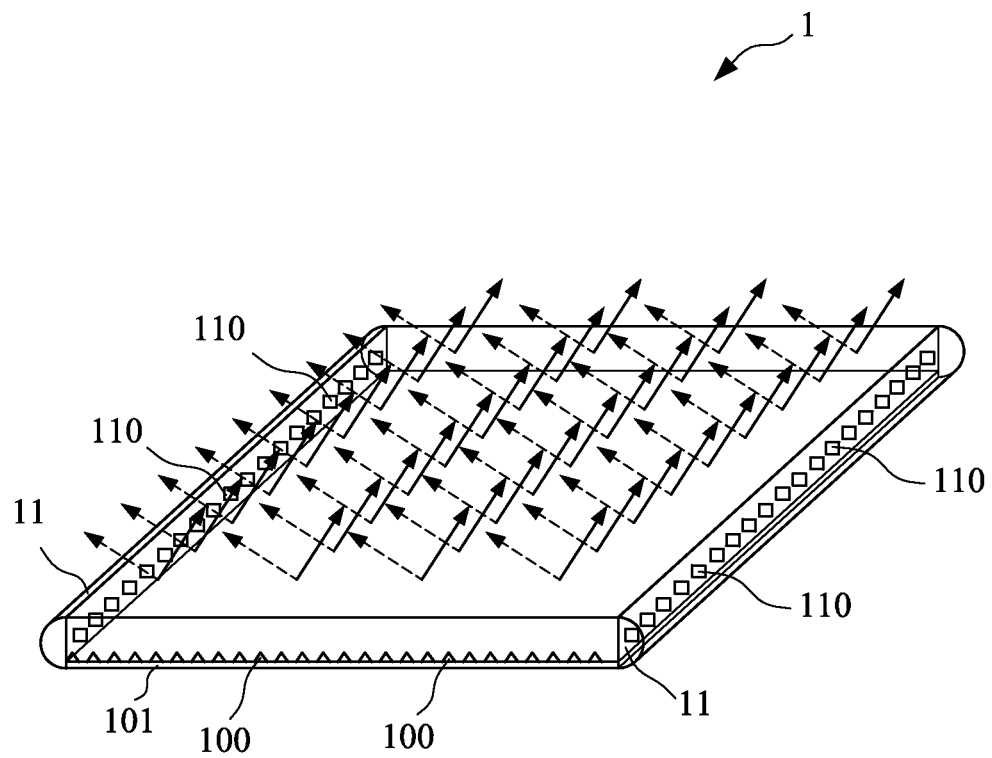
FIG. 2 is still a schematic view showing the application of the first embodiment of the present invention.
Figure 3A:
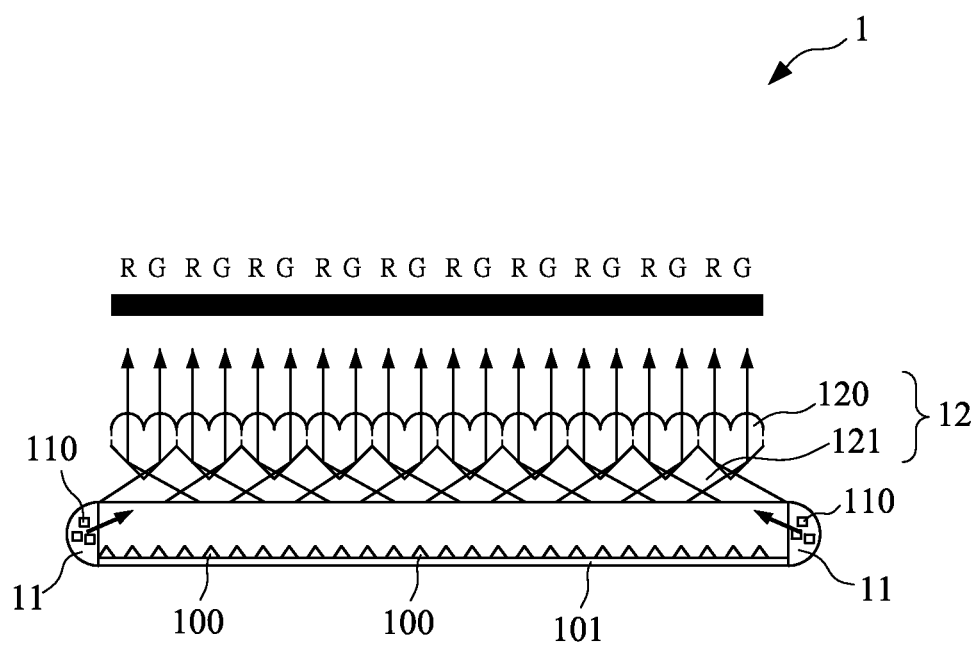
FIG. 3A is a schematic view showing that one light source emits green light while the other light source emits red light.
Figure 3B:
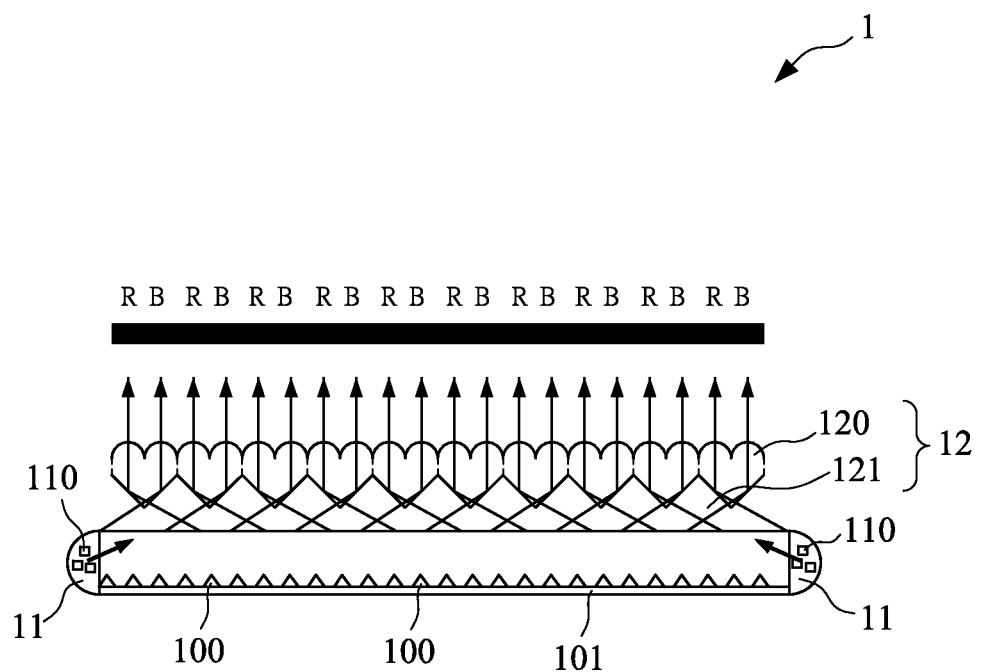
FIG. 3B is still a different schematic view showing that one light source emits blue light while the other light source emits red light.

With reference to FIGS. 1 to 3B, it is noted that the present invention has two embodiments disclosing the energy saving color separation system, wherein in the first embodiment, the chronological energy saving color separate system 1 includes:
a guide module 10 directing incident light which is sideways relative to the guide module 10 to emerging light with an angle relative to a horizontal surface of the guide module 10;
at least one light source module 11 respectively provided on a surface of the guide module 10 and composed of multiple illuminating elements 110 formed in arrays to illuminate in two time sequences with different wavelengths entering the guide module 10; and
a color splitting module 12 mounted on the guide module 10 and composed of a first surface 120 and a second surface 121, wherein the first surface 120 is composed of a collar structure per unit cycle and the second surface 121 is composed of a prismatic structure or a polygonal structure per unit cycle. The prismatic structure or the polygonal structure of the second surface 121 per unit cycle corresponds to the collar structure of the first surface 120 within two unit cycles. In time sequence 1, the light source module 11 is able to emit light with specific wavelengths, wherein the light source module 11 in the left side emits green light and the light source module 11 in the right side emits red light (as shown in FIG. 3A) so as to generate green and red pixel respectively. In time sequence 2, the light source module 11 in the left side emits blue light and the light source module 11 in the right side emits red light (as shown in FIG. 3B) to respectively generate blue and red pixel. As a result of the combination of the two time sequences, red, blue and green, three colors are generated. The multiple illuminating elements 110 are light emitting diodes (LEDs) or laser beam. In a preferred embodiment, the illuminating elements 110 are light emitting diodes capable of emitting light of red, blue and green colors. To enable the light from the light source module 11 to be projected to the guide module 10, a reflection shield or reflection plate is provided outside the guide module 10.

The light source module 11 is either provided at the side or the bottom of the guide module 10 and emits light with wavelength ranging from 400 nm to 650 nm.

The guide module 10 further includes multiple miniaturized reflection structure 100 and a reflection plate 101. The miniaturized reflection structure 100 is provided at the bottom of the guide module 10 to direct incident light which is sideway relative to the guide module 10 to emergent light with an angle larger than 50 degrees relative to the normal line of the guide module 10. The reflection plate 101 is provided at the bottom of the guide module 10 and of the miniaturized reflection structure 100 to direct incident light sideway relative to the guide module 10 to emergent light with an angle larger than 50 degrees relative to the normal line of the guide module 10.

The second surface 121 of the color splitting module 12 may be composed of a refraction structure, a deflection structure or the combination thereof to deflect light path.

In a preferred embodiment of the present invention, the color splitting module 12 is at least a membrane with a refractive index ranging from 0.35 to 1.65 and having a top surface and a bottom surface both provided with miniaturized structure. The miniaturized structure on the top surface of the membrane is spheric refraction structure with a period ranging from 25 micro-meter to 1000 micro-meter for convergence of light and the miniaturized structure on the bottom surface of the membrane is polygonal structure with a period ranging from 50 micro-meter to 1000 micro-meter for reflection light path.

The structure mentioned above is able to generate specific color splitting at specific positions such that using specific color distribution as a result of time sequences, a full color display may then just be presented.

Figure 4A:
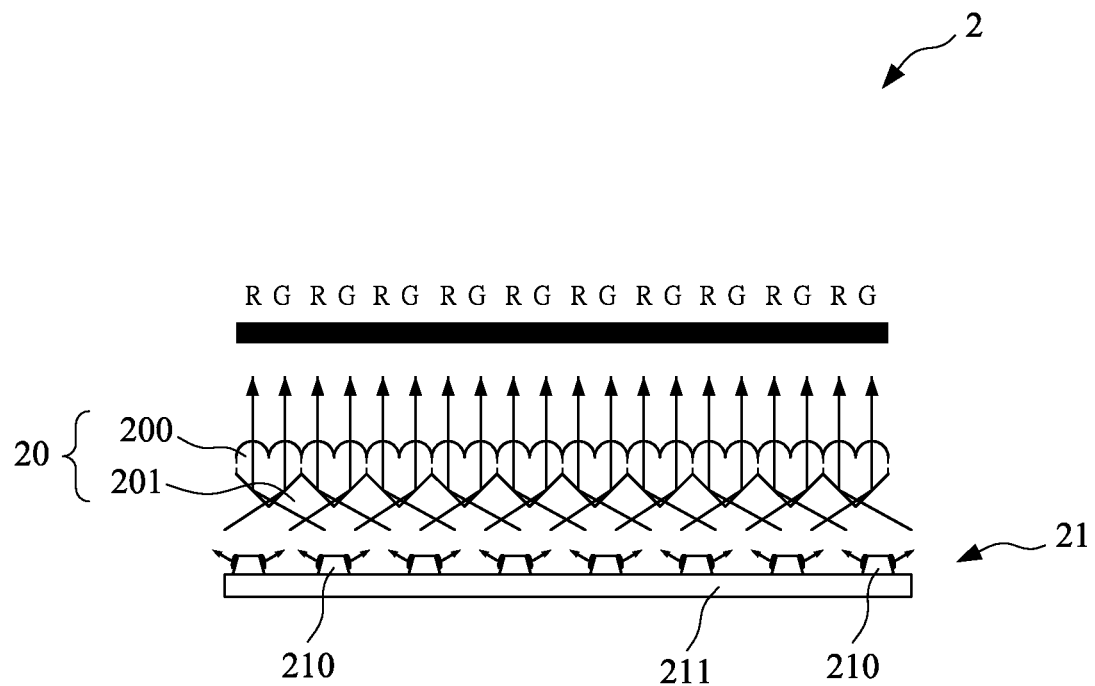
FIG. 4A is a schematic view showing the second embodiment of the present invention, wherein red light is emitted by the left side of the illuminating array and green light is emitted by the right side of the illuminating array.
Figure 4B:
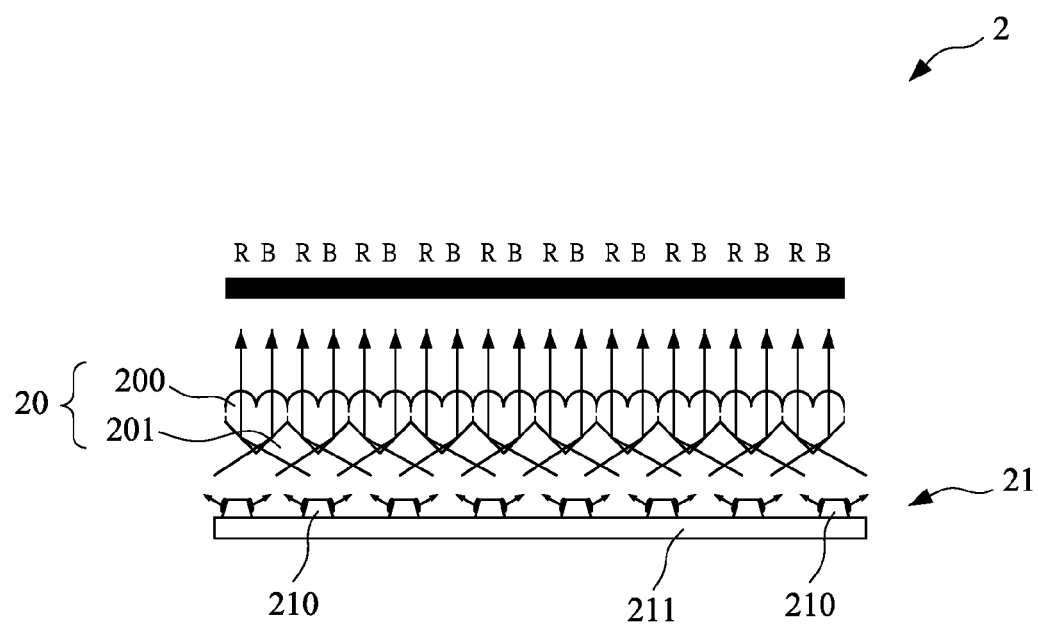
FIG. 4B is still a schematic view showing the second embodiment of the present invention, wherein red light is emitted by the left side of the illuminating array and blue light is emitted by the right side of the illuminating array.

With reference to FIGS. 4A and 4B, a second embodiment of the present invention is presented and includes:
a color splitting module 20 having a first surface 200 and a second surface 201, wherein the first surface 200 is composed of a collar structure per unit cycle and the second surface 201 is composed of a prismatic structure or a polygonal structure per unit cycle, the prismatic structure or the polygonal structure of the second surface 201 per unit cycle corresponds to the collar structure of the first surface 200 within two unit cycles; and
a light source module 21 provided under the color splitting module 20 and having multiple light illuminating arrays 210 capable of emitting light with different wavelengths and a substrate 211, wherein light from the light illuminating arrays 210 is sideway relative to the color splitting module 20 and generated in two time sequences with different wavelengths to enter the color splitting module 20.

The wavelength from the light source module 21 is from 400 nm to 650 nm and the angle between the emergent angle from the light illuminating arrays 210 to the normal line of the second surface of the color splitting module 20 is larger than 50 degrees.

In this embodiment of the present invention, the second surface 201 of the color splitting module 20 is composed of reflection structure, deflection structure or the combination thereof to deflect light path. In another preferred embodiment of the present invention, in sequence 1, light beams of different wavelengths are emitted by the light illuminating arrays 210 on the left side and right side thereof. For example, red light is being emitted on the left side of the light illuminating arrays 210 and green light is being emitted on the right side of the light illuminating arrays 210, as shown in FIG. 4A. The color splitting module 20 capable of deflection and convergence of light is able to generate red and green colors. On the other hand, in sequence 2, light beams of different wavelengths are emitted on the left and right sides of the light illuminating arrays 210. For example, red light is being emitted on the left side of the light illuminating arrays 210 and blue light is emitted on the right side of the light illuminating arrays 210, as shown in FIG. 4B and the color splitting module 20 capable of light deflection and convergence is able to generate red and blue colors. Therefore, it is noted that within these two sequences, red, blue and green colors are generated to form a full color image.

In still a preferred embodiment of the present invention, the color splitting module 20 is at least a membrane made of a material with a refractive index from 1.35 to 1.65. Micro structures are formed on the top surface and bottom surface of the membrane and are periodical spherical and non-spherical refraction structures, respectively. The period of the micro structures is from 50 micro-meter to 1000 micro-meter for light path deflection.

The color splitting module 20 adopts roll-to-roll, R2R; roll to sheet, R2S; or sheet to sheet, S2S ultra fine manufacture process to adapt to mass production and effectively reducing cost.

By way of the device and method mentioned above, it is to be noted that light beams with specific wavelengths in different time sequences are directed to enter the guide module. Therefore, the light beams are able to enter the liquid crystal layer vertically with consistent high optical effect.

While the invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A time sequence energy saving color separation system, comprising:
    a guide module for guiding light sideways relative to the guide module to a direction inclined to an emerging surface of the guide module;
    at least one light source provided on a surface of the guide module and composed of multiple light illuminating elements capable of illuminating light beams with different wavelengths and arranged in array, the at least one light source being able to illuminate light beams with specific wavelengths in two time sequences and entering the guide module; and
    a color splitting module provided on the guide module, comprising a first surface and a second surface, wherein the first surface is a collar structure per unit cycle and the second surface is a non-spherical structure per unit cycle, the non-spherical structure per unit cycle corresponds to the collar structure every two unit cycles.

2. The color separation system as claimed in claim 1, wherein the light illuminating elements are light emitting diodes.

3. The color separation system as claimed in claim 1, wherein the at least one light source is provided on side face or bottom face of the guide module, the at least one light source is able to generate light beam with a wavelength ranging from 400 nm to 650 nm.

4. The color separation system as claimed in claim 1, wherein the guide module further comprises multiple reflection structure and a reflection plate, the reflection structure is provided at a bottom of the guide module to direct incident light which is sideway relative to the guide module to emergent light with an angle larger than 50 degrees relative to normal line of the guide module, the reflection plate is provided at bottom of the guide module and of the reflection structure to direct incident light sideway relative to the guide module to emergent light with an angle larger than 50 degrees relative to the normal line of the guide module.

5. The color separation system as claimed in claim 1, the color splitting module being at least a membrane made of a material with a reflective index of 1.35 to 1.65, and the membrane having a top surface and a bottom surface both provided with miniaturized structure, the miniaturized structure on the top surface of the membrane is spheric refraction structure with a period ranging from 25 micro-meter to 1000 micro-meter for convergence of light and the miniaturized structure on the bottom surface of the membrane is polygonal structure with a period ranging from 50 micro-meter to 1000 micro-meter for reflection light path.

6. The color separation system as claimed in claim 5, wherein the bottom surface is composed of a reflection structure, a refraction structure or a combination thereof for light path deflection.

7. A color separation system comprising:
    a color splitting module comprising a first surface and a second surface, wherein the first surface is composed of a collar structure per unit cycle and the second surface is composed of a prismatic structure or a polygonal structure per unit cycle, the prismatic structure or polygonal structure of the second surface per unit cycle corresponds to the collar structure of the first surface every two cycles; and
    a light source mounted below the light splitting module and comprising multiple illuminating arrays emitting light with different wavelengths and a substrate, wherein light from the illuminating arrays is inclined relative to the color splitting module and the illuminating arrays illuminate in different time sequences with specific wavelengths so as to generate full color.

8. The color separation system as claimed in claim 7, wherein light beam from the light source has a wavelength ranging from 400 nm to 650 nm, angle between emergent angle from the light illuminating arrays to normal line of the second surface of the color splitting module is larger than 50 degrees.

9. The color separation system as claimed in claim 7, wherein the color splitting module is at least a membrane made of a material with a refractive index of 1.35 to 1.65, spheric periodical refraction structure with a period of 25 micro-meter to 1000 micro-meter is formed on a top face of the membrane for light convergence and a periodical polygonal structure with a period of 50 micro-meter to 1000 micro-meter is formed on a bottom face of the membrane for light refraction.

10. The color separation system as claimed in claim 7, wherein the second surface of the color splitting module is composed of a refraction structure, diffraction structure or combination thereof for light refraction.

* * * * *